April 7, 1959

W. C. HUGHES ET AL 2,881,318

FREQUENCY SWEEP GENERATOR

Filed May 23, 1957

INVENTORS,
WILLIAM C. HUGHES
& MILES SKRIVANEK.
BY
Harry M. Saragovitz
ATTORNEY.

United States Patent Office 2,881,318
Patented Apr. 7, 1959

2,881,318

FREQUENCY SWEEP GENERATOR

William C. Hughes, Chicago, Ill., and Miles Skrivanek, New York, N.Y., assignors to the United States of America as represented by the Secretary of the Army Application May 23, 1957, Serial No. 661,265

3 Claims. (Cl. 250—36)

This invention relates to oscillation generators, the object of the invention being to provide a generator the frequency of which is capable of being continuously varied, the change in frequency being periodically repeated.

The particular type of generator utilized in the invention is one producing a pulse waveform. Thus, the repetition rate of the pulse generator is continuously variable. Basically the invention comprises the employment of a multi-element tube as one element of the frequency-determining element of a pulse generator, with the repetition rate of the generator dependent upon an applied grid voltage of the multi-element tube.

Figure 1:
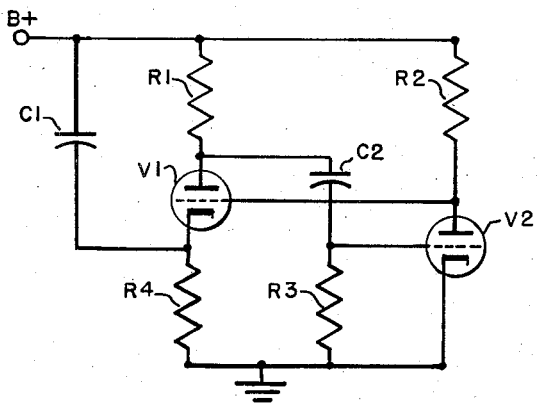
Figure 2:
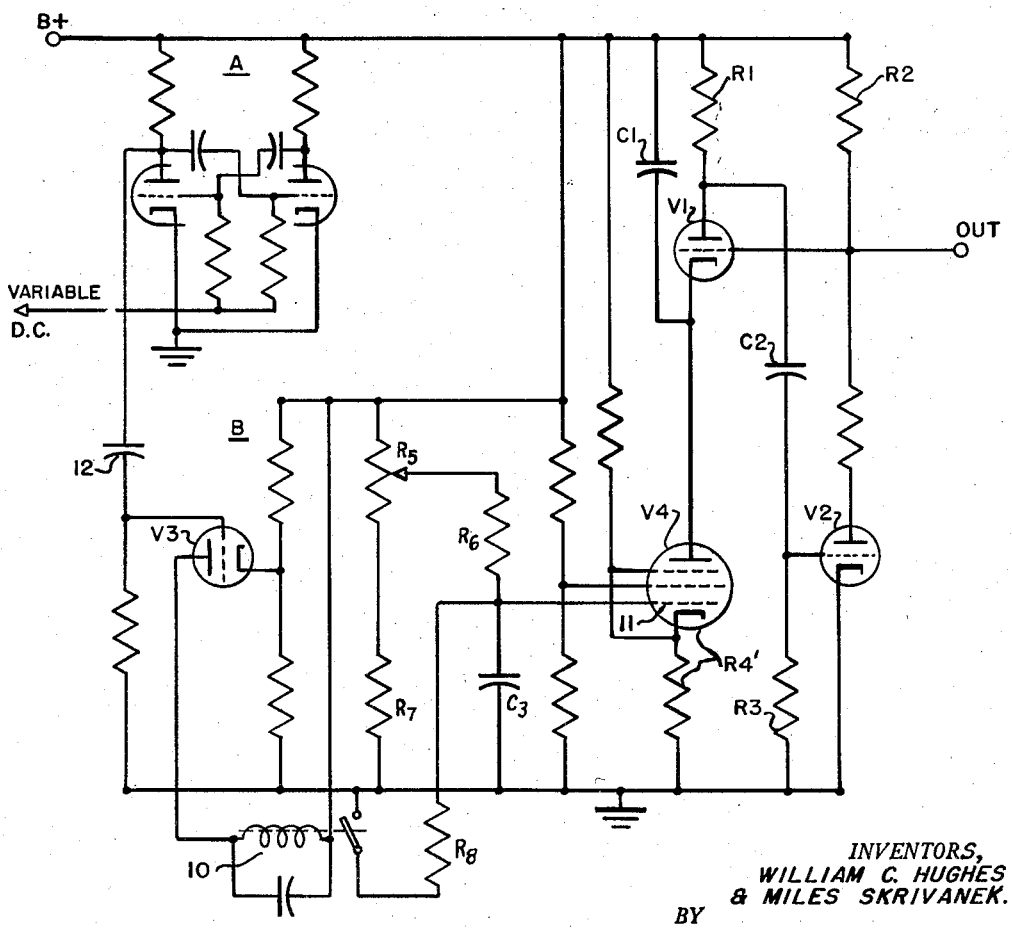

The exact nature of the invention and its various features, objects, and advantages will be more fully understood from a consideration of the following embodiment, illustrated in the accompanying drawing in which:

Figure 1 is a circuit diagram from which the basic nature and operation of the variable frequency pulse generator can be shown, and Figure 2 is a diagram of a circuit utilized in a preferred embodiment of the invention.

As shown in Figure 1, the basic circuit of the invention consists of an astable multivibrator in which one of the coupling condensers has been replaced by a direct connection. As can be seen from this figure, elements $V_1$ and $V_2$ represent the two triodes of an astable multivibrator with a coupling condenser $C_2$ and resistor $R_3$ providing the coupling between the plate of tube $V_1$ and the grid of tube $V_2$. As shown, a direct connection is provided between the plate of tube $V_2$ and the grid of tube $V_1$. A capacitor $C_1$ is coupled between the plate supply B+ and the cathode of $V_1$. A cathode resistor for tube $V_1$ is shown at $R_4$ connected to ground potential.

The operation of the circuit shown in Figure 1 is as follows:

Assume that the multivibrator is in a state of transition and $V_1$ is just beginning to conduct. As it does, the plate voltage of $V_1$ drops due to the flow of current and a negative signal is passed to the grid of $V_2$ holding $V_2$ cutoff through the network $C_2$ and $R_3$. As $V_1$ conducts, $C_1$ will charge to the difference in potential between the B+ voltage and the drop across $R_4$. This circuit condition remains until the charge in the condenser $C_2$ has leaked away sufficiently to permit anode current to flow once more in tube $V_2$. When $V_2$ begins to conduct, its plate voltage will thereupon begin to drop. This decrease reduces the grid voltage of $V_1$, causing its plate voltage to rise and thereby causing a further increase in the grid voltage of $V_2$. This action cumulates until $V_2$ is conducting heavily and $V_1$ is cutoff. The multivibrator will remain in this state as long as $C_1$ keeps charging toward B+, thus keeping the cathode of $V_1$ highly positive; as soon as the charging current of $C_1$ decreases, however, the cathode of $V_1$ will fall in potential and the grid of $V_1$ will take control thereby initiating the entire cycle over again.

Since the time at which the cycle of operation recurs depends on the charging and discharging of $C_1$ it is thus seen that the frequency (pulse repetition rate) is determined by the value of components $C_1$ and $R_4$. Varying one or the other or both will vary the repetition frequency of the multivibrator and comparatively large ranges of frequency change will result from changes in the components.

One embodiment of a circuit utilizing the features of the multivibrator decreased above is shown in Figure 2. In this figure a pentode $V_4$ is used as resistance $R_4$ and the effective resistance of the pentode is made to vary proportionately with a voltage applied to its grid. Any suitable voltage waveform may be used as the controlling voltage applied to the grid; in the particular embodiment shown a sawtooth voltage is developed and applied to the grid, thereby giving as the output of the multivibrator a saw tone frequency, i.e. a periodically repeating linearly varying frequency.

Referring now to Figure 2, the elements which perform the same function as in Figure 1 are labeled alike. The variable frequency generator is shown at the right-hand side of Figure 2, and it can be seen that the only change from Figure 1 as far as the oscillator per se is concerned is that resistor $R_4$ in Figure 2 is composed of a pentode $V_4$ and its associated cathode resistor $R_4$ as shown.

The circuit designated B is a conventional vacuum-tube sawtooth sweep generator. This circuit utilizes a control tube $V_3$ and a relay, shown as element 10, for providing a sawtooth voltage wave output which is impressed on grid 11 of pentode $V_4$ as shown. Condenser $C_3$ is charged through resistor $R_6$ from a voltage divider $R_5$ and $R_7$ connected between B+ and ground. Upon closing of the relay contacts by conduction of $V_3$, condenser $C_3$ is discharged through $R_8$. $C_3$ is coupled to grid 11 of $V_4$. The change in resistance of $V_4$ as the applied grid voltage changes will serve to vary the frequency of the output of the multivibrator composed of tubes $V_1$ and $V_2$ since the time constant is changed as discussed with reference to Figure 1.

The circuit B shown is only illustrative of one form of sawtooth voltage generator which can be used. Any desired sawtooth generator can be used. In addition, if it is desired to produce an output with frequency varying other than linearly, any generator having the desired output voltage waveform can be substituted for circuit B.

The circuit generally designated A in Figure 2 applies a trigger signal for the sawtooth voltage generator through capacitor 12 to trigger tube $V_3$. The trigger circuit is herein illustrated as a multivibrator, but this is merely used as one illustration of a standard trigger circuit and other circuits giving a desired trigger output can be used. With a sawtooth voltage generator such as shown at B, the time between trigger pulses will determine the period of the linearly varying frequency output of the saw tone generator $V_1$ and $V_2$.

Although the operation of the invention has been described in terms of specific circuits, these have been designated merely by way of illustrative example and it should be appreciated that the invention is not limited to the specific structures described herein. Various modifications which do not depart from the spirit and scope of the invention will suggest themselves to those skilled in the art to which this invention pertains.

What is claimed is:

1. A saw-tone generator comprising a free-running multivibrator which includes first and second electron tubes each having a cathode, grid, and plate, a source of positive potential, a resistor coupling each plate to said source of positive potential, a capacitor coupling the plate of the first tube to the grid of the second tube, the plate of the second tube being coupled to the grid of the first tube, the cathode of the second tube being grounded, and impedance means coupling the cathode of the first tube to ground, said impedance means comprising a pentode tube having a cathode, a control grid and a plate, the pentode plate being coupled to the cathode of the first tube, a timing condenser connected between said pentode grid and ground, and means for charging and discharging said timing condenser.

2. A saw-tone generator according to claim 1 wherein the means for charging and discharging said timing condenser includes an impedance network coupled from said source of positive potential to said timing condenser for charging said timing condenser, relay means shunting said timing condenser for causing discharge thereof, and another electron tube coupled to and controlling said relay means.

3. A saw-tone generator according to claim 2 including a second multivibrator having means for varying the frequency thereof and coupled to said other electron tube for controlling the rate of frequency change of said saw-tone generator.

References Cited in the file of this patent

UNITED STATES PATENTS

| | | |
|---|---|---|
| 2,750,502 | Gray | June 12, 1956 |
| 2,777,951 | Charlton | Jan. 15, 1957 |

FOREIGN PATENTS

| | | |
|---|---|---|
| 725,559 | Germany | Sept. 24, 1942 |